United States Patent [19]

Dubensky et al.

[11] Patent Number: 5,563,107
[45] Date of Patent: Oct. 8, 1996

[54] DENSIFIED MICROGRAIN REFRACTORY METAL OR SOLID SOLUTION SOLUTION (MIXED METAL) CARBIDE CERAMICS

[75] Inventors: Ellen M. Dubensky; Stephen D. Dunmead, both of Midland; Robert T. Nilsson, Coleman, all of Mich.

[73] Assignee: The Dow Chemical Company, Midland, Mich.

[21] Appl. No.: 530,289

[22] PCT Filed: Apr. 26, 1994

[86] PCT No.: PCT/US94/04780

§ 371 Date: Sep. 22, 1995

§ 102(e) Date: Sep. 22, 1995

[87] PCT Pub. No.: WO94/25412

PCT Pub. Date: Nov. 10, 1994

Related U.S. Application Data

[63] Continuation-in-part of Ser. No. 56,142, Apr. 30, 1993, abandoned.

[51] Int. Cl.⁶ .................................................. C04B 35/56
[52] U.S. Cl. .................................................. 501/87
[58] Field of Search .......................... 501/89, 92; 419/18, 419/17, 15

[56] References Cited

U.S. PATENT DOCUMENTS

| 4,744,943 | 5/1988 | Timm | 419/10 |
|---|---|---|---|
| 4,753,678 | 6/1988 | Maruyama et al. | 75/238 |
| 4,828,584 | 5/1989 | Cutler | 51/307 |
| 4,945,073 | 7/1990 | Dubensky et al. | 501/93 |
| 5,089,447 | 2/1992 | Timm et al. | 501/87 |
| 5,215,945 | 6/1993 | Dubensky et al. | 501/94 |

FOREIGN PATENT DOCUMENTS 0360567  3/1990  European Pat. Off. .

OTHER PUBLICATIONS

A. G. Evans, "Impact Damage Mechanics: Solid Projectiles", Treatise on Materials Science and Technology, vol. 16, pp. 63–65 (1979) No Month.
J. K. Lancaster, "Abrasive Wear", Tribology in Particulate Technology, p. 329 (1987) No Month.
E. A. Almond et al., "Some Characteristics of Very-–Fine–Grained Hardmetals", Metal Powder Report, Jul./Aug. 1987, vol. 42, No. 7/8.
Junichi Hojo et al., "The Sinterability of Ultrafine WC Powders Obtained by a CVD Method", *Journal of Materials Science*, (1980), pp. 2335–2344 No Month.

*Primary Examiner*—Karl Group

[57] ABSTRACT

Densified refractory carbide and solid solution carbide materials that have an average grain size of less than 1.1 μm, a density of at least 98% of theoretical may be prepared by any conventional densification procedure. Pressure densified tungsten carbide ceramic materials exhibit a simultaneous increase in Vickers hardness and a toughness ($K_{IC}$) with decreasing average grain size.

14 Claims, No Drawings

DENSIFIED MICROGRAIN REFRACTORY METAL OR SOLID SOLUTION SOLUTION (MIXED METAL) CARBIDE CERAMICS

CROSS-REFERENCE TO RELATED APPLICATION

This application is a continuation-in-part of application Ser. No. 08/056,142, filed Apr. 30, 1993, now abandoned.

TECHNICAL FIELD

The invention relates generally to densified ceramic bodies prepared from refractory metal carbides, solid solution (mixed metal) carbides or mixtures thereof. The invention relates more particularly to densified bodies having an average grain size of less than 1.1 micrometers (μm). It relates still more particularly to densified, polycrystalline tungsten carbide (WC) bodies prepared from WC powder having an average grain size of less than 1.1 micrometer (μm).

BACKGROUND OF THE INVENTION

Early work with WC focused upon densifying WC by heating to a temperature of, for example, 2000° Centigrade (°C). The densified material was judged unsuitable for use in applications requiring toughness, such as in cutting tools. The unsuitability stemmed largely from the densified material's excessively brittle character.

Efforts to overcome or offset some of the brittleness led to incorporation of an amount of a metal by admixing powdered metal and WC powder to form a composite and densifying the composite at a temperature above that at which the metal melts. The metal, most frequently an iron group metal (iron, cobalt or nickel), was added to impart some of its ductility to the composite. The densified composites, also known as cemented carbides, cermets and hard metals, have been used extensively for several decades.

Cutler (U.S. Pat. No. 4,828,584) discloses ceramic bodies that are at least 98.5% by volume WC with substantially all grains having an average size of less than 15 μm, preferably less than 10 μm and more preferably less than 5 μm. A grain size range of 0.1 to 5.0 μm is reportedly quite useful. Cutler also discloses preparation of the ceramic bodies by sintering greenware made from WC particles having a diameter of less than 15 μm, preferably less than 5 μm. Grain sizes between 5 and 15 μm provide high toughness and grain sizes between 1 and 3 μm yield higher strength and lower toughness. As the grain size increases, the fracture mode changes from intergranular to transgranular fracture.

Maruyama et al. (U.S. Pat. No. 4,753,678) disclose cemented carbides based upon WC and either vanadium carbide or zirconium nitride as a hard phase and 4 to 20% by weight (wt %) of cobalt as a metal or binder phase.

Eric A. Almond et al., in "Some Characteristics of Very-Fine Grained Hardmetals", *Metal Powder Report*, Vol 42, No. 7/8, pages 512, 514 and 515 (July/August 1987) teach that binder-phase hard metals experience an asymptotic decrease in fracture toughness as grain size decreases.

SUMMARY OF THE INVENTION

In one aspect, the invention is a densified ceramic body consisting essentially of polycrystalline tungsten carbide having an average grain size of less than 1.1 μm, the body having a density of at least 98 percent of its theoretical density and a void volume of less than 2 percent, based upon total body volume and, as grain size decreases, a concurrent increase in Vickers hardness and toughness ($K_{IC}$).

In a related aspect, the present invention is a densified ceramic body consisting essentially of polycrystalline WC having an average grain size of less than 1.1 μm, the body having a density of at least 98 percent of its theoretical density, a void volume of less than 2 percent, based upon total body volume, a toughness ($K_{IC}$) that increases as grain size decreases and is greater than 5.0 MPa.m$^{1/2}$, a Vickers hardness that increases as grain size decreases and is greater than 2000 kg/mm$^2$, and a fracture mode that displays an increasing percentage of transgranular fracture as grain size decreases.

Another aspect of the invention is a densified ceramic body consisting essentially of at least one ceramic material selected from refractory metal carbides and solid solution (mixed metal) carbides, the body having an average grain size within a range of from greater than 0.0 to less than 1.1 micrometers, a density of at least 98 percent of theoretical density and a void volume of less than 2 percent, based upon total body volume.

DETAILED DESCRIPTION OF THE INVENTION

Tungsten carbide ceramics of the invention can be tailored for use in particular applications by an appropriate choice of starting WC powder size and by controlling densification conditions to minimize grain growth. Desirable starting powder sizes fall within a range of from greater than 0.0 μm up to 1.1 μm. The range is preferably from 0.1 to 0.6 μm, more preferably from 0.1 to 0.4 μm. Starting powder sizes of less than 0.1 μm should provide densified bodies having excellent properties. Such powders may, however, may be more difficult to process than powders within a range of 0.1 to 1.1 μm. In some applications, the resultant properties may be sufficiently desirable to outweigh any such processing difficulties.

Tungsten carbide powders having an average particle size of less than or equal to 1.1 μm are commercially available. One such powder, Syl-Carb™ Type SC104 (GTE Sylvania), has a nominal average particle size of 0.6 μm and includes a small amount of vanadium carbide as a grain growth inhibitor. Attriting such a powder simultaneously reduces the average particle size, reduces grain size distribution, and more uniformly disperses the grain growth inhibitor. Even in the absence of a grain growth inhibitor, attrition provides the benefits of smaller average particle size and a narrower particle size distribution. As an alternative, the WC powder may have these characteristics as synthesized. As a further alternative, powders with even larger average particle sizes may be used provided they are milled or attrited under conditions sufficient to reduce the average particle size to less than or equal to 1.1 μm. These powders necessarily require longer size reduction procedures and may, as a consequence, pick up additional quantities of impurities from media used to promote size reduction.

WC powders need not be 100% pure. In other words, they may contain very small amounts, normally less than 1 wt % based on total powder weight, of other materials so long as the other materials do not interfere with densification of the powder or adversely affect physical properties of resultant densified bodies. Examples of "other materials" include cobalt, iron, nickel, carbon and silicon. The other materials may, for example, be present as a result of powder synthesis procedures or as residue from milling operations. In addition to the other materials, the WC powders have an oxygen content that varies inversely with particle size. In other words, as particle size decreases, oxygen contents tend to increase. As with the other materials, the oxygen content should be maintained at a level that does not interfere with densification of the powder or adversely affect physical properties of resultant densified bodies.

Grain size can be controlled by careful control of densification procedures even if the WC powder does not include a grain growth inhibitor. Any conventional densification technique may be used provided it yields the densified ceramic body of the invention. Conventional techniques include pressureless or low pressure sintering, hot pressing, hot isostatic pressing and rapid omnidirectional compaction. Densification is preferably accomplished via rapid omnidirectional compaction (ROC), a technique that employs mechanically induced pressure, such as that generated using a forging press, to densify greenware or powder bodies heated to a suitable temperature prior to application of pressure.

Timm (U.S. Pat. No. 4,744,943) discloses, at column 5, line 27 through column 6, line 15, combinations of time, temperature and pressure suitable for purposes of the present invention. Illustrative temperatures and pressures vary, respectively, from 400° C. to 2900° C. and from 68.9 to 3,450 megapascals (MPa). Time at pressure may vary from as long as one hour or more to as short as 20 seconds or less. As a general rule, the temperature is below the liquidus temperature of the material being densified, the pressure is high enough to effect consolidation without fracturing the material and the time is as short as possible consistent with achieving adequate densification.

Dubensky et al. (U.S. Pat. No. 4,945,073) propose, at column 11, lines 50–54, a technique for easing densified part recovery. They wrap greenware in graphite foil or some other substantially inert material prior to placing the greenware in a glass pocket die or other densification medium.

Densified WC bodies that are prepared with applied pressure, preferably by ROC, have an average grain size of 1.1 μam or less have performance characteristics that run counter to conventional wisdom, particularly as the average grain size becomes progressively smaller and approaches 0.2 μm. Prior teachings, including those of Cutler, suggest that, as average grain size In the densified part decreases, toughness decreases in exchange for an increase in hardness (sometimes referred to in prior teachings as strength). The teachings also suggest that the fracture mode changes from intergranular to transgranular as grain size increases. The densified WC bodies of the invention surprisingly show a concurrent increase in toughness ($K_{IC}$) and Vickers hardness as average grain size decreases, In addition, the fracture mode has an increasing percentage of transgranular fracture as the average grain size decreases. Both trends become readily discernible as the average grain size falls below 0.6 μm. They become even more pronounced as the average grain size decreases further and approaches 0.1 μm. The trends should continue with average grain sizes of less than 0.1 μm. As the Vickers hardness and fracture toughness increase, abrasion wear resistance and erosion wear resistance should also increase. A. G. Evans, in "Impact Damage Mechanics: Solid Projectiles", *Treatise on Materials Science and Technology*, Vol 16, pages 63–65 (1979), discusses prediction of erosion wear rates. J. K. Lancaster, in "Abrasive Wear", *Tribology in Particulate Technology*, page 329 (1987), discusses prediction of abrasion wear rates in ceramics. These trends are expected to continue with further decreases in average grain size. The average grain size is limited largely by synthesis and size reduction procedures.

Densified WC bodies that are prepared by ROC have an average grain size of from 0.1 μm to 1.1 μm and a density of at least 98 % of theoretical with a void volume of less than 2% by volume, based on total body volume. These WC bodies typically have a toughness ($K_{IC}$) of from 5 to 7 MPa.m$^{1/2}$, a Vickers hardness of from 2000 to 3000 kg/mm$^2$. Densified WC bodies having an average grain size of less than 0.1 μm are expected to have a toughness greater than or equal to 7.0 MPa. m$^{1/2}$ and a Vickers hardness of greater than 3000 kg/mm$^2$.

An examination of ROC densified WC body microstructures shows that grain boundaries are very clean and that substantially all material (also referred to as "contaminants") other than WC is concentrated at triple points. The triple points have a size of 200 angstroms (Å) by 400 Å (20 nanometers (nm) by 40 nm). The material at the triple points is substantially all carbides or mixed carbides and amounts to no more than one volume percent based upon total volume of a densified body. The densified body is also substantially fully dense with any voids having a size less than that of the WC grains.

Densified WC bodies that are prepared without applied pressure, as in pressureless sintering, have an average grain size that is 1.1 μm or less, a density that is at least 98 percent of theoretical, and a void volume of less than 2 percent, based on total body volume. These bodies have a Palmqvist toughness that is preferably at least 24 kg/mm and a Vickers hardness that is at least 2200 kg/mm$^2$, preferably at least 2500 kg/mm$^2$.

Densified ceramic bodies prepared from at least one ceramic material selected from refractory metal carbides and solid solution (mixed metal) carbides are suitable for use in a variety of end use applications. By way of illustration, densified WC bodies, particularly those prepared by ROC, are especially useful for use in high wear applications such as nozzles, particularly waterjet cutting nozzles and spray dry nozzles. The bodies are also suitable for use as drills, pump seals and cutting tools. Additional applications are disclosed in an illustrative list at column 2, lines 29–48, of U.S. Pat. No. 4,945,073.

Refractory metal carbide powders other than WC powder and solid solution (mixed metal) carbide powders may also be used to produce densified ceramic bodies. These bodies should display performance trends or physical property improvements similar to those described herein with regard to WC powder and densified WC bodies. The metal portion of the metal carbide and solid solution carbide powders is selected from Groups IV B, V B and VI B of The Periodic Table of the Elements (Chemical Abstracts Service (CAS) version). The metals are titanium, zirconium and hafnium for Group IV B, vanadium, niobium and tantalum for Group V B, and chromium, molybdenum and tungsten for Group VI B. Illustrative refractory metal carbides include hafnium carbide, titanium carbide, vanadium carbide, niobium carbide, chromium carbide, zirconium carbide and molybdenum carbide. Illustrative solid solution carbides include tungsten-titanium carbide, tungsten-molybdenum carbide, tungsten-vanadium carbide, tungsten-tantalum carbide, molybdenum-tantalum carbide, titanium-tantalum carbide, tungsten-titanium-tantalum carbide, hafnium-tantalum carbide, titanium-hafnium carbide, tungsten-chromium carbide, tungsten-titanium-chromium carbide, tungsten-tantalum-chromium carbide and titanium-tantalum-hafnium carbide. The order of listing of the metals in the solid solution carbides is not critical.

Solid solution (mixed metal) carbides and refractory metal (Groups IVB, VB and VIB) carbides including WC may be synthesized using the apparatus described in U.S. Pat. No. 5,110,565 in general terms at column 6, lines 52–56 and in greater detail at column 7, line 5 through column 8, line 61. Process conditions such as those described in Example 3 below may be used in conjunction with this apparatus. In general, a reactive particulate mixture of at least one metallic oxide selected from the oxides of the Group IVB, Group VB and Group VIB metals and a carbon source is heated to an elevated temperature at a rate of between 100 K/second and 100,000,000 K/second to effect rapid carbothermal reduction of the mixture. The temperature is maintained for a period of time sufficient to convert the mixture into a product selected from a metallic carbide, a metallic carbide precursor, a solid sorbtion carbide, a solid solution carbide precursor or a mixture thereof. As an illustration, when making a WC precursor the elevated temperature is within a range of 1400° C. (1673 K) to 2400° C. (2673 K).

Metallic carbides such as WC can be prepared by an alternate procedure wherein a non-static solid reactant mixture of a metal oxide and a source of carbon is heated to a first elevated temperature in a nonreducing atmosphere (nitrogen or argon) to partially carburize the mixture. The partially carburized mixture is then cooled, mixed with an additional amount of carbon sufficient to form an adjusted mixture having a total carbon content equal to a stoichiometric amount needed to make the metallic carbide. The adjusted mixture is carburized in a hydrogen-containing atmosphere at a second elevated temperature that is sufficient to yield a metallic carbide having a particle size of less than 0.2 μm. An apparatus such as that described in Example 4 below may be used with this procedure.

Densified solid solution carbide hardness and toughness values are affected by a number of factors, only one of which is grain size. Another key factor is grain to grain compositional variation.

Hardness and toughness values for densified refractory metal (Groups IVB, VB and VIB) carbides other than WC also depend on factors in addition to grain size. This is particularly true for carbides, such as TiC and TaC, that have wide phase fields compared to WC. Hardness values are reported to vary significantly with carbon stoichiometry across the phase fields. One such report is contained in a book edited by Henry H. Hausner and Melvin G. Bowman and entitled Fundamentals of Refractory Compounds, at pages 34–37 and 172–173 (1968). Irrespective of whether these materials are densified with applied pressure, they have an average grain size that is less than 1.1 μm. Some variation in hardness and Palmqvist toughness (W) also occurs depending upon whether densification occurs with applied pressure. Pressure assisted densification yields densified bodies with a density of at least 98 percent of theoretical, a Palmqvist toughness of at least 14 kg/mm, preferably at least 18 kg/mm, more preferably at least 23 kg/mm, and a Vickers hardness of at least 1800 kg/mm$^2$, preferably at least 2300 kg/mm$^2$ and more preferably at least 2800 kg/mm$^2$. Sintering yields densified bodies with a density of at least 98 percent of theoretical, a Palmqvist toughness of at least 24 kg/mm and a Vickers hardness of at least 1700 kg/mm$^2$, preferably at least 2200 kg/mm$^2$.

The following examples illustrate, but do not limit, either explicitly or implicitly, the invention.

EXAMPLE 1

Commercially available WC powder (300 grams of Type SC04 WC from GTE) having an average grain size of 0.6 μm and a vanadium carbide content of 0.37 wt %, based upon total powder weight, was milled for 8 hours in an attritor (Union Process, laboratory scale, model 01HD) at a speed of 330 revolutions per minute (rpm). The attritor contained 7.2 kilograms (kg) of WC-Co balls as milling media in 400 ml n-heptane. The attrited powder and heptane were recovered from the milling media and mixed with a solution of paraffin wax (1.5 wt %, based on WC weight) in heptane, and warmed slightly (below the boiling point of heptane). The attrited powder was then separated from the heptane and dried using a rotary evaporator. The paraffin wax was added as a binder during drying. The attrited powder was and passed through a 20 mesh (Tyler equivalent) (850 μm sieve opening) screen. The powder picked up less than 0.16% Co during attrition.

Greenware parts were made by cold-Dressing the screened powder in steel tooling at 5,000 pounds per square inch (psi) (35 MPa) to provide a part having a size of 1.6 inch (in) by 4.2 in by 0.44 in (4.1 cm by 10.7 cm by 1.1 cm). The parts were cold isostatically pressed at 30,000 psi (210 MPa) before being dewaxed at 350° C. under vacuum. The parts were then wrapped in graphite foil and placed into a fluid die surrounded by PYREX™ brand glass (Corning Glass Works).

The fluid die was heated under nitrogen at a rate of 10° C. per minute to 1525° C. and held at that temperature (also known as "preheat temperature") for 30 rain before being isostatically pressed at 120,000 psi (830 MPa) with a time at pressure of 20 seconds. The pressing procedure is described in more detail in U.S. Pat. No. 4,744,943 at column 1, lines 41–67, column 5, line 27through column 6, line 16 and column 7, line 20through column 10, line 40; U.S. Pat. No. 4,428,906 at column 3, line 6 through column 6, line 32; and U.S. Pat. No. 4,656,002 at column 3, line 22 through column 5, line 6. The fluid die was cooled in air before the parts were recovered by gently breaking the cooled die and lightly grit blasting any remaining graphite foil or glass from the parts.

Physical property testing of the recovered parts provided the following results:

Density: 15.55 g/co (98.6% of theoretical based on pure WC)

Hardness(Rockwell A): 95.8±0.06

Hardness, Vickers (1 kg load, 15 second dwell): 2864±44 kg/mm$^2$

Palmqvist Toughness (W) (13.6 kg load): 26.2±0.6 kg/mm

Toughness ($K_{IC}$): 7.1±0.06 MPa.m$^{1/2}$

Wear Number (Abrasion) (ASTM G65-80): 717±56 cm$^{-3}$

The density of pure WC is reported to be 15.77 g/cc in Smithell's Metals Reference Book, 6th Ed., pg 23-1 (1983).

Analytical work involved the use of metallography, light microscopy, analytical scanning electron microscopy (ASEM), analytical transmission electron microscopy (ATEM), and X-ray diffraction (XRD). Microstructures were observed under ASEM, ATEM, and light microscopes. ASEM and ATEM provided grain size measurements and were averaged. ATEM also evaluated the triple point composition and XRD indicated W$_2$C content.

The average grain size was 0.25 μm, based upon a mean of a 0.18 μm average grain size (ATEM) and a 0.33 μm average grain size (ASEM). The triple point volume was 0.9%, based upon total part volume. The triple point composition was crystalline, eta phase and a mixture of cobalt, iron, vanadium, and tungsten (W$_2$C) carbides. The W$_2$C content (XRD) was 1.8%.

EXAMPLE 2

Example 1 was repeated with four modifications: substituting VYCOR™ brand glass (Corning Glass Works) for the PYREX™ brand glass; increasing the amount of WC powder to 1000 g; eliminating attritor milling; and increasing the preheat temperature to 1800° C. Physical property test results of recovered parts are shown in Table I. Transgranular fracture percentage was determined from backscattered electron images of cracks emanating from Vickers indentations taken with a scanning electron microscope at 5,000 to 20,000X magnification. The images were used to determine the percentage of grains that a crack passed through along a crack path.

EXAMPLE 3

A reactive particulate mixture of tungsten trioxide (WO3) (Osram-Sylvania T0-3) and carbon (C) (Chevron Shawinigan™ Acetylene Black) was prepared by milling 1.74 kg of C and 9.66 kg of $WO_3$ for 1 hour using 180 kg of 1.3 cm diameter tungsten carbide-cobalt (WC-Co) media in a 152 liter (l) mill that was lined with polyurethane. The resultant mixture was a uniform dispersion of C and $WO_3$ when observed through an optical microscope at 200X. The maximum size of the powder grains was 10 µm.

A quantity (50 kg) of the reactive particulate mixture was loaded into a feed hopper of a reactor apparatus like that described in U.S. Pat. No. 5,110,565 in general terms at column 6, lines 52–56 and in greater detail at column 7, line 5 through column 8, line 61. The apparatus had a cooled reactant transport member, a reaction chamber, a heat source, and a cooling chamber. The reaction chamber had a length of 3.35 meters (m) and an inside diameter of 15.2 cm. The feed hopper was connected to the cooled reactant transport member by a twin screw loss-in-weight feeder. The reactant transport member had an inside diameter of 1.3 cm and was maintained at a temperature of 10° C. (283 K.) by water flowing through a cooling jacket surrounding the reactant transport member. The feed hopper was purged with argon gas for 30 minutes after the reactive particulate mixture was loaded into it, while the reaction chamber was brought to a temperature of 1550° C. (1823 K.) as measured by optical pyrometers viewing the outside wall of the reaction chamber. Argon gas flowed into the reactant transport member at a rate of 85 standard liters per minute (slpm), while an additional 28 slpm of argon gas flowed into the reaction chamber via a gas flow space around the reactant transport member's perimeter.

The reactive particulate mixture was fed from the hopper into the cooled reactant transport member at a rate of 0.11 kg per minute by the twin screw feeder. The flowing argon gas entrained the particulate mixture and delivered it to the reaction chamber as a dust cloud. The mixture was immediately heated in the reaction chamber at a rate of approximately 10,000 to 100,000,000 K per second. The average residence time of the reactant particulate mixture was 4 seconds, forming a product containing tungsten carbide (WC), tungsten (W), and ditungsten carbide ($W_2C$).

After exiting the reaction chamber, the flowing argon gas carried the product into a water cooled stainless steel jacket that rapidly cooled the product to less than 10° C (283 K). XRD analysis of the cooled product confirmed that it was composed on WC, W, and $W_2C$. The product, an unfinished precursor, contained 3.16 wt % oxygen and 4.67 wt % total carbon. The precursor had an average particle diameter, as determined by scanning electron microscopy (SEM), of 0.1 µm.

In order to achieve pure WC, the precursor was subjected to a finishing step. An amount (250 g) of the product was milled with WC-Co milling media for 1 hour before 7.13 g of the same C as in the reactive particulate mixture was added and milling continued for 30 minutes. After milling, the mixture was screened through a 60 mesh screen (250 µm sieve opening). The screened material was placed into a quartz boat and heat-treated to 1250° C. (1523 K.) for 1 hour in a 5% hydrogen - 95% argon atmosphere. High resolution XRD analysis of the product showed that it contained WC with a small trace of residual $W_2C$. LECO combustion analysis of the final product measured carbon and oxygen contents of 6.04 wt % and 0.40 wt %, respectively. SEM showed the average particle size of the WC to be between 0.1 and 0.2 µm.

An amount (450 g) of the final product was, with two modifications, densified as in Example 2. The modifications were: using two hours of attritor milling; and decreasing the preheat temperature to 1700° C. Physical property test results, other than triple point volume percentage, of recovered parts are shown in Table I. The triple point volume percentage was 0.2%.

EXAMPLE 4

A milled mixture of 9.65 kg of $WO_3$ and 1.75 kg of C was prepared as in Example 3. The $WO_3$ and C were the same as in Example 3. One kg of the milled mixture was placed into a graphite crucible having a diameter of 20 cm and a length of 23 cm. The graphite crucible was then placed in an induction furnace having a volume of 100 liters. The crucible was positioned at a 22.5° angle with respect to horizontal and rotated at approximately 6 rpm. The furnace was heated to 1120° C. (1393 K) while flowing 20 slpm of argon through the furnace. The temperature of the furnace was first increased at 20° C./minute to 1000° C. (1273 K.) and then increased at about 5° C./minute to 1120° C. and maintained at that temperature for 15 minutes before the crucible was allowed to cool naturally to yield an unfinished precursor.

XRD analysis of the precursor showed that it contained W, $W_2C$ and WC in roughly the same proportions as that produced in Example 3. The unfinished precursor had an average particle diameter (SEM) of less than 0.1 µm and oxygen and total carbon contents (LECO combustion analysis) of 0.40 wt % and 4.93 wt %, respectively.

The unfinished precursor was converted to a final product as in Example 3 using 3.2 g of C and 250 g of the unfinished product. The final product had an average particle diameter (SEM) of 0.1 to 0.2 µm and oxygen and total carbon contents (LECO combustion analysis) of 0.15 wt % and 6.10 wt %, respectively. XRD analysis of the final product confirmed that it was composed primarily of WC. No residual W or $W_2C$ was detected.

An amount (450 g) of the final product was densified as in Example 3, but at a lower reheat temperature of 1650° C. Physical property test results, other than triple point volume percentage, of recovered parts are shown in Table I. The triple point volume percentage was 0.2%.

EXAMPLE 5

A finished product powder was prepared as in Example 3 using 9.65 kg $WO_3$ and 1.75 kg C. The powder had an average particle diameter (SEM) of 0.1 to 0.2 µm and oxygen and total carbon contents (LECO combustion analysis) of 0.34 wt % and 6.10 wt %, respectively. XRD analysis of the powder showed that it was composed primarily of WC with no detectable residual W or $W_2C$.

An amount (380 g) of the finished product powder was densified as in Example 3, but with an attritor milling time of 4 hours and a preheat temperature of 1600° C. Physical property test results of recovered parts are shown in Table I.

EXAMPLE 6

Example 2 was repeated using a 400 g amount of a commercial powder (General Electric) having a nominal average particle size of 0.85 μm. The term "nominal average particle size", as used herein, refers to supplier specifications. Physical property test results of recovered parts are shown in Table I.

EXAMPLE 7

Example 6 was repeated using a commercial powder (General Electric) having a nominal average particle size of 1.55 μm. Physical property test results of recovered parts are shown in Table I.

yield densified bodies that exhibit a tradeoff between toughness ($K_{IC}$) and Vickers hardness. In other words, as average grain size in a densified body increases, toughness ($K_{IC}$) increases at the expense of Vickers hardness. Conversely, as average grain size in a densified body decreases and approaches 1.1 μm, Vickers hardness increases at the expense of toughness ($K_{IC}$). Again, similar results are expected with other refractory metal carbides and solid solution metal carbides.

EXAMPLE 8

Example 1 was repeated, with certain modifications, to convert 11 g taken from an attrited 150 g batch of a commercially available TiC powder (Japan New Metals, grade TiC-007) having an average grain size of 0.8 μm into a densified part. The modifications were dewaxing in a nitrogen atmosphere at 600° C. (873 K.), changing the greenware size to 0.3 in by 0.3 in by 1.0 in (0.8 cm by 0.8 cm by 2.5 cm), uniaxially cold pressing the greenware at 24,000 psi (165 MPa), using VYCOR™ brand glass rather than PYREX™ brand glass, heating under argon to a preheat

TABLE I

| | Densified Part Properties | | | | | | |
|---|---|---|---|---|---|---|---|
| Example Number | Density (g/cc) | Vickers Hardness[1] | Wear Number (cm$^{-3}$) | Transgranular Fracture (%) | Average Grain Size (μm) | Palmqvist Toughness (W)[2] | Toughness |
| 1 | 15.55 | 2864 ± 44 | 717 ± 56 | — | 0.25 | 26.2 ± 0.6 | 7.1 ± 0.06 |
| 2 | 15.5 | 2657 ± 69 | 508 ± 23 | 35.3 | 0.33 | 23.9 ± 0.6 | 6.72 ± 0.12 |
| 3 | 15.7 | 2883 ± 56 | 638 ± 22 | 28.4 | 0.30 | 25.7 ± 0.23 | 7.08 ± 0.04 |
| 4 | 15.7 | 2770 ± 53 | 563 ± 40 | — | 0.31 | 25.5 ± 0.86 | 6.93 ± 0.24 |
| 5 | 15.5 | 2900 ± 65 | 814 ± 40 | — | 0.19 | 26.3 ± 1.7 | 7.23 ± 0.24 |
| 6 | 15.4 | 2140 ± 107 | — | 13.2 | 0.65 | 21.2 ± 1.0 | 5.67 ± 0.14 |
| 7 | 15.5 | 1837 ± 73 | — | 6.5 | 1.10 | 19.9 ± 0.6 | 5.07 ± 0.10 |

—means not measured; [1]1 kg load (kg/mm$^2$); [2](13 kg load) (kg/mm); [3](MPa · m$^{1/2}$)

The data presented in Table I demonstrate that increases in Vickers hardness, toughness ($K_{IC}$) and percent transgranular fracture mode occur simultaneously as the average grain size of pressure densified tungsten carbide decreases below 1.1 μm. These increases necessarily lead to concurrent improvements in both relative erosive wear resistance and relative abrasive wear resistance. The latter increases are particularly desirable in high wear applications such as waterjet cutting nozzles. Although the data only show average grain sizes as low as 0.19 μm in Example 5, further improvements or increases in such properties are expected as the average grain size becomes progressively smaller.

Similar results are expected with other WC powders that have an average particle size, prior to densification, of less than or equal to 1.1 μm and yield a pressure densified body wherein the average grain size is less than or equal to 1.1 μm. Similar results may occur with sintered WC bodies or with other densified refractory metal carbides and solid solution metal carbides. The metal or, in the case of solid solutions, combination of metals is selected from groups IV B, V B and VI B of the Periodic Table of the Elements (CAS version). Although some variation may occur with respect to physical properties and the upper limit for average grain size as one uses another refractory metal carbide or a solid solution carbide, a revised upper limit may be readily determined without undue experimentation.

By way of contrast, WC powders having an average particle size prior to densification of greater than 1.1 μm temperature of 1800° C. (2073 K.), and increasing the time at pressure to 25 seconds. Physical properties of the densified part are given in Table II.

EXAMPLE 9

Example 8 was repeated, with certain modifications, to convert 560 g of a commercially available TaC powder (H.C. Starck) having an average grain size of 0.5 to 1.5 μm into a densified part. The modifications were dewaxing as in Example 1 and changing the preheat temperature to 1700° C. (1973 K.). Physical properties of the densified part are given in Table II.

EXAMPLE 10

The conditions of Example 9 were repeated, but at a preheat temperature of 1600° C. (1873 K.), to convert 500 g of a commercially available (W,Ti)C solid solution carbide powder (STD-100 grade, H.C. Starck) having an average grain size of 2–5 um and a composition of 65.5% W, 24.3% Ti, 10.0% C into a densified part. Physical properties of the densified part are given in Table II.

EXAMPLE 11

The conditions of Example 9 were repeated, but at a preheat temperature of 1500° C. (1773 K.) with nitrogen rather than argon and with PYREX™ brand glass rather than VYCOR™ brand glass, to convert 500 g of a commercially available (W,Ti,Ta)C solid solution carbide powder (from H.C. Starck) having an average grain size of 2–4 um and a composition of 31.2% W, 26.6% Ti, 31.1% Ta, 10.6% C into a densified part. Physical properties of the densified part are given in Table II.

EXAMPLE 12

A milled mixture of 9.44 kg of $WO_3$, 0.18 kg of $Ta_2O_5$ (Aldrich Cat #30,351-8), and 1.74 kg C was prepared as in Example 3. The $WO_3$ and C were the same as used in Example 3. This mixture was designed to provide a finished product with a theoretical composition of 92.93wt % W, 0.95wt % Ta, and 6.12wt % C. An amount (10 kg) of the milled mixture was reacted as in Example 3 to prepare an unfinished product having an average particle diameter (SEM) of less than 0.1 μm and oxygen and total carbon contents (LECO combustion analysis) of 1.93 wt % and 4.55 wt %, respectively.

The unfinished product is converted to a final product as in Example 3 using 6.07 g of C and 250 g of the unfinished product. The final product had an average particle diameter (SEM) of about 0.1 μm and oxygen and total carbon contents (LECO combustion analysis) of 0.22 wt % and 6.08 wt %, respectively. XRD analysis of the final product showed that it was composed primarily of a W-Ta carbide solid solution with a WC crystal structure. No residual TaC was detected.

An amount (11 g taken from a 90 g attrited batch) of the final product was converted into a densified part using the procedure and conditions of Example 9, but with a milling time of one hour rather than 8 hours and at a temperature of 1600° C. Physical properties of the densified part are shown in Table II.

EXAMPLE 13

A milled mixture of 9.44 kg of $WO_3$, 0.18 kg of $HfO_2$ (Aldrich Cat #20,211-8), and 1.74 kg C was prepared as in Example 12. The $WO_3$ and C were the same as used in Example 3. This mixture was designed to provide a finished product with a theoretical composition of 91.99 wt % W, 1.87 wt % Hf, and 6.14 wt % C. An amount (10 kg) of the milled mixture was reacted as in Example 3 to prepare an unfinished product having an average particle diameter (SEM) of less than 0.1 μm and oxygen and total carbon contents (LECO combustion analysis) of 2.07 wt % and 4.63 wt %, respectively.

The unfinished product is converted to a final product as in Example 3 using 5.98 g of C and 250 g of the unfinished product. The final product had an average particle diameter (SEM) of about 0.2 μm and oxygen and total carbon contents (LECO combustion analysis) of 0.68 wt % arid 6.05 wt %, respectively. XRD analysis of the final product showed that it was composed primarily of WC and $HfO_2$.

An amount (11 g taken from a 90 g attrited batch) of the final product was converted into a densified part using the procedure of and conditions of Example 9, but with a milling time of one hour rather than 8 hours. Physical properties of the densified part are shown in Table II.

It is believed that an increase in synthesis temperature would reduce the $HfO_2$ and yield a W-Hf carbide solid solution. Densified part properties from such a solid solution should be better than those of the densified part prepared in this Example.

EXAMPLE 14

A milled mixture of 9.35 kg of $WO_3$, 0.22 kg of $TiO_2$ (Aldrich Cat #24857-6), and 1.80 kg C was prepared as in Example 12. The $WO_3$ and C were the same as used in Example 3. This mixture was designed to provide a finished product with a theoretical composition of 91.99wt % W, 1.60wt % Ti, and 6.41 wt % C. An amount (10 kg) of the milled mixture was reacted as in Example 3 to prepare an unfinished product having an average particle diameter (SEM) of less than 0.1 μm and oxygen and total carbon contents (LECO combustion analysis) of 1.73 wt % and 4.82 wt %, respectively.

The unfinished product is converted to a final product as in Example 3 using 5.13 g of C and 250 g of the unfinished product. The final product had an average particle diameter (SEM) of about 0.1 μm and oxygen and total carbon contents (LECO combustion analysis) of 0.57 wt % and 6.08 wt %, respectively. XRD analysis of the final product showed that it was composed primarily of a W-Ti carbide solid solution with a WC crystal structure. No residual TiC was detected.

An amount (11 g from a 90 g attrited batch) of the final product was converted into a densified part using the procedure of Example 9. Physical properties of the densified part are shown in Table II.

EXAMPLE 15

A milled mixture of 9.25 kg of $WO_3$, 0.34 kg of $MoO_3$ (Aldrich Cat #26785-6), and 1.78kg C was prepared as in Example 3. The $WO_3$ and C were the same as used in Example 12. This mixture was designed to provide a finished product with a theoretical composition of 91.05wt % W, 2.82wt % Mo, and 6.13wt % C. An amount(10 kg) of the milled mixture was reacted as in Example 8 to prepare an unfinished product having an average particle diameter (SEM) of less than 0.1 μm and oxygen and total carbon contents (LECO combustion analysis) of 1.23 wt % and 4.41 wt %, respectively.

The unfinished product was converted to a final product as in Example 3 using 5.75 g of C and 250 g of the unfinished product. The final product had an average particle diameter (SEM) of about 0.1 μm and oxygen and total carbon contents (LECO combustion analysis) of 0.40 wt % and 6.00 wt %, respectively. XRD analysis of the final product showed that it was composed primarily of a W-Mo carbide solid solution with a WC crystal structure. No residual $Mo_2C$ was detected.

An amount (11 g from a 90 g attrited batch) of the final product was converted into a densified part using the procedure of Example 9, but with a milling time of one hour rather than 8 hours. Physical properties of the densified part are shown in Table II.

EXAMPLE 16

A milled mixture of 8.91 kg of $WO_3$, 0.67 kg of $MOO_3$, and 1.81 kg C was prepared as in Example 15. The $WO_3$, $MoO_3$ and C were the same as used in Example 15. This mixture was designed to provide a finished product with a theoretical composition of 6 wt % $Mo_2C$ and 94 wt % WC. An amount (10 kg) of the milled mixture was reacted as in Example 8 to prepare an unfinished product having an average particle diameter (SEM) of less than 0.1 μm and oxygen and total carbon contents (LECO combustion analysis) of 4.07 wt % and 5.32 wt %, respectively.

The unfinished product is converted to a final product as in Example 8 using 9.58 g of C and 250 g of the unfinished product. The final product had an average particle diameter (SEM) of 0.3 μm and oxygen and total carbon contents (LECO combustion analysis) of 0.36 wt % and 5.58 wt %, respectively. High resolution XRD analysis of the final product shows that it is composed primarily of a W-Mo carbide solid solution with a WC crystal structure having an a-cell parameter of 2.9062±0.0001 Angstroms (Å) (2.9062× $10^{-10}$ m) and a c-cell parameter of 2.8396±0.0004 Å, (2.8396×$10^{-10}$ m). These parameters compare with an a-cell parameter of 2.9055±0.0002 Å, (2.9055×$10^{-10}$ m) and a c-cell parameter of 2.8396±0.0004 Å, (2.8396×$10^{-10}$ m) for pure WC. These data demonstrate that the tungsten-molybdenum carbide lattice was contracted as compared with pure WC, but only in one dimension.

An amount (11 g from a 90 g attrited batch) of the final product was converted into a densified part using the procedure and conditions of Example 9, but at 1600° C. with a milling time of one hour rather than 8 hours. Physical properties of the densified part are shown in Table II.

TABLE II

| Example No. | Density (g/cm$^3$) | Vickers Hardness (1 kg load) (kg/mm$^2$) | Average Grain Size (μm) | Palmqvist Toughness (kg/mm) |
|---|---|---|---|---|
| 8 | 4.73 | 2080 ± 28 | 0.25$^{(2)}$ | 14.1 ± 0.4 |
| 9* | 14.30 | 1754 ± 44 | 4.3$^{(1)}$ | — |
| 10 | 9.66 | 2335 ± 59 | 0.34$^{(1)}$ | 18.4 ± 0.3 |
| 11 | 9.01 | 2316 ± 60 | 0.33$^{(1)}$ | 18.1 ± 0.2 |
| 12 | 15.32 | 3022 ± 35 | 0.18$^{(3)}$ | 25.3 ± 1.2 |
| 13 | 15.14 | 1878 ± 57 | 1.0$^{(1)}$ | 25.4 ± 1.6 |
| 14 | 14.89 | 2930 ± 79 | 0.15$^{(3)}$ | 23.4 ± 1.0 |
| 15 | 14.96 | 2860 ± 90 | 0.19$^{(3)}$ | 24.4 ± 0.3 |
| 16 | 14.58 | 1985 ± 20 | 0.57$^{(1)}$ | 25.4 ± 1.1 |

—means not measured; $^{(1)}$grain size measured by SEM; $^{(2)}$grain size measured by TEM; $^{(3)}$grain size reported as an average of SEM and TEM measurements; *not an example of the invention The data in Table II demonstrate that densified refractory metal carbides, other than TaC (Example 9*), and solid solution carbides can be made by the invention. These materials exhibit high hardness and toughness. The grain size and resultant properties of TaC (Example 9*) render it unsuitable for most purposes.

EXAMPLE 17

An amount (11 g) of the same WC powder as in Example 1 (attrited in a larger attritor) was converted into a uniaxially cold pressed part as in Example 8. The attritor (Union Process, Model 1-S) contained 50 kg of 3/16 inch (0.5 cm) WC-Co milling media, 5000 g of the WC powder and 3000 ml heptane. The attritor operated at a speed of 275 rpm. The part was dewaxed at a temperature of 450° C. for 10 hours in nitrogen. The dewaxed part was placed in a graphite furnace and heated, under a nitrogen atmosphere, at a rate of 10° C./min up to a sintering temperature of 1700° C. The sintering temperature was maintained for one hour to yield a sintered part before the furnace and its contents were cooled to room temperature (25° C.). The sintered part was then removed from the furnace and subjected to physical property testing, the results of which are shown in Table III.

EXAMPLE 18

Except for using the same attritor as in Example 1 and reducing the milling time to 6 hours to prepare a milled mixture of a powder prepared as in Example 3, Example 17 was repeated. Prior to sintering, the WC powder had oxygen and total carbon contents (LECO combustion analysis) of 0.24 wt % and 5.96 wt %, respectively. Physical property test results are shown in Table III.

EXAMPLE 19

A commercial WC powder (Tokyo Tungsten, Ltd, WC02N) having reported oxygen and total carbon contents of 0.35 wt % and 6.30 wt %, respectively, an average particle diameter of 0.25 μm and a chromium carbide ($Cr_3C_2$) content of 1 wt % was milled for 6 hours and then sintered as in Example 18, but at a temperature of 1650° C. Physical property test results are shown in Table III.

EXAMPLE 20

A finished (W, Ti)C solid solution powder prepared as in Example 14 was milled and sintered as in Example 19, but at a temperature of 1750° C. Prior to milling, the finished powder had oxygen and total carbon contents (LECO combustion analysis) of 0.56 wt % and 5.80 wt %, respectively. Physical property test results are shown in Table III. A standard deviation for Palmqvist toughness was not calculated because only one indent was made.

EXAMPLE 21

A finished (W, Mo)C solid solution powder prepared as in Example 15 was milled and sintered as in Example 20. Prior to milling, the finished powder had oxygen and total carbon contents (LECO combustion analysis) of 0.28 wt % and 6.20 wt %, respectively. Physical property test results are shown in Table III.

EXAMPLE 22

A finished (W, Ta)c solid solution powder prepared as in Example 12 was milled and sintered as in Example 20. Prior to milling, the finished powder had oxygen and total carbon contents (LECO combustion analysis) of 0.29 wt % and 6.04 wt %, respectively. Physical property test results are shown in Table III.

EXAMPLE 23

Example 21 was repeated, but with a milling time of one hour rather than 6 hours and a sintering temperature of 1800° C. rather than 1750° C. Physical property test results are shown in Table III.

EXAMPLE 24

Example 18 was repeated, but with a milling time of one hour rather than 6 hours and a sintering temperature of 1800° C. rather than 1700° C. Physical property test results are shown in Table III.

TABLE III

| Example No. | Density (g/cm$^3$) | Vickers Hardness (1 kg load) (kg/mm$^2$) | Average Grain Size (μm) | Palmqvist Toughness (kg/mm) |
|---|---|---|---|---|
| 17 | 15.32 | 2590 ± 83 | 0.30$^{(3)}$ | 26.6 ± 0.4 |
| 18 | 14.92 | 2309 ± 86 | 0.31$^{(3)}$ | 26.0 ± 0.4 |
| 19 | 15.63 | 2657 ± 39 | 0.21$^{(3)}$ | 27.2 ± 0.6 |
| 20 | 15.55 | 2325 ± 91 | 0.24$^{(3)}$ | 26.1 |
| 21 | 15.11 | 2337 ± 43 | 0.27$^{(3)}$ | 25.4 ± 0.9 |
| 22 | 15.55 | 2324 ± 46 | 0.32$^{(3)}$ | 27.0 ± 0.6 |
| 23 | 14.99 | 1716 ± 94 | 0.34$^{(3)}$ | $^{(2)}$ |

TABLE III-continued

| Example No. | Density (g/cm³) | Vickers Hardness (1 kg load) (kg/mm²) | Average Grain Size (μm) | Palmqvist Toughness (kg/mm) |
| --- | --- | --- | --- | --- |
| 24* | 15.51 | 1666 ± 48 | 1.75[3] | 28.0 ± 2.7 |

*not an example of the invention; [2]not measured; [3]average of SEM and TEM measurements The data in Table III show that materials of the invention may also be prepared by pressureless sintering. Example 23, when compared to Example 21, suggests that the relatively higher physical properties of Example 21 may be due, at least in part, to a longer milling time and lower sintering temperature for Example 21. A similar observation may be made by comparing Example 24* with Examples 17 and 18.

Taken together, the data in Tables II and III show that a variety of densification procedures provide materials of the invention. Similar results are expected with hot pressing, hot isostatic pressing or a combination of sintering and hot isostatic pressing.

The materials of Table II, prepared by rapid omnidirectional compaction, tend to have a higher dislocation density than the sintered materials of Table III. This is believed to account, in part, for their higher hardness values.

EXAMPLE 25

Sintered Nozzle

A quantity (37 g) of the powder produced in Example 17 was used to fabricate greenware in the shape of a venturi nozzle with, as outside dimensions, a length of 1.4 inch (3.6 cm) and a diameter 0.53 inch (1.3 cm) and, as internal dimensions, a minimum diameter of 0.15 inch (0.4 cm) and an exit diameter of 0.33 inch (0.8 cm). The greenware was cold isostatically pressed at a pressure of 30,000 psi (207 MPa) and then dewaxed and sintered as in Example 17, but with a sintering temperature of 1650° C. rather than 1700° C. and a time at the sintering temperature of 30 minutes rather than one hour. The sintered nozzle had a density of 15.51 g/cm³ and a Vickers Hardness of 2492±54 kg/mm². Similar results are expected with other refractory metal carbides, solid solution carbides and other greenware shapes.

What is claimed is:

1. A densified ceramic body consisting essentially of one refractory metal carbide or one solid solution carbide, the body having an average grain size within a range of from greater than 0.0 to less than 1.1 micrometers, a density of at least 98 percent of theoretical density, a hardness of at least 1700 Kg/mm² and a void volume of less than 2 percent.

2. A densified ceramic body as claimed in claim 1, wherein the body is a pressure densified body having a Palmqvist toughness of at least 24 kg/mm and a hardness of at least 1800 kg/mm².

3. A densified ceramic body as claimed in claim 1, wherein the body is a sintered body having a Palmqvist toughness of at least 24 kg/mm and a hardness of at least 1700 kg/mm².

4. A densified body as claimed in claim 1, wherein the refractory metal carbide is a carbide of a metal selected from the group consisting of: a Group IV B metal, a Group V B metal and a Group VI B metal.

5. A densified body as claimed in claim 1, wherein the refractory metal carbide is selected from the group consisting of hafnium carbide, titanium carbide, vanadium carbide, niobium carbide, tungsten carbide, chromium carbide, zirconium carbide and molybdenum carbide.

6. A densified body as claimed in claim 1 wherein the solid solution carbide is selected from the group consisting of tungsten-titanium carbide, tungsten-molybdenum carbide, tungsten-vanadium carbide, tungsten-tantalum carbide, molybdenum-tantalum carbide, titanium-tantalum carbide, tungsten-titanium-tantalum carbide, hafnium-tantalum carbide, titanium-hafnium carbide, tungsten-chromium carbide, tungsten-titanium-chromium carbide, tungsten-tantalum-chromium carbide and titanium-tantalum-hafnium carbide.

7. A densified ceramic body consisting essentially of polycrystalline tungsten carbide having an average grain size of less than about 1.1. micrometer, the body having a void volume of less than about 2 percent, based upon total body volume density of at least 98% of its theoretical density and a hardness of at least 1700 kg/mm².

8. A densified body as claimed in claim 7, wherein the body exhibits, as grain size decreases, a concurrent increase in Vickers hardness and fracture toughness ($K_{IC}$).

9. A densified body as claimed in claim 7, wherein the Vickers hardness is at least 2000 kg/mm² and the toughness ($K_{IC}$) is at least 5.0 MPa.m$^{1/2}$.

10. A densified body as claimed in claim 7, wherein the average grain size is 0.1 micrometer or larger and the body has a Vickers hardness of 2000 to 3000 kg/mm² and a toughness ($K_{IC}$) of 7.0 MPa.m$^{1/2}$.

11. A densified body as claimed in claim 7, wherein the body contains contaminants and substantially all of the contaminants are concentrated at grain boundary triple points.

12. A densified body as claimed in claim 11, wherein the triple points have a size of 200 angstroms (Å) by 400 Å, (20 nanometers (nm) by 40 nm).

13. A densified body as claimed in claim 11, wherein the body is substantially fully dense with any voids having a size less than that of the WC grains.

14. A densified body as claimed in claim 1, wherein the solid solution metal carbide is a carbide of at least two metals selected from the group consisting of: a Group IV B metal, a Group V B metal and a Group VI B metal.

* * * * *